Patented Mar. 3, 1936

2,032,465

UNITED STATES PATENT OFFICE 2,032,465

AMINO-HYDROXY-NAPHTHONITRILES AND PROCESSES OF PREPARING SAME

William Bradley, Manchester, and Robert Robinson, Oxford, England, assignors to Imperial Chemical Industries Limited, a corporation of Great Britain No Drawing. Application July 7, 1932, Serial No. 621,306. In Great Britain July 10, 1931

9 Claims. (Cl. 260—99.30)

This invention relates to the production of substituted naphthalene compounds and more particularly refers to the production of amino-naphthols which have substituted thereon a cyano group.

It is an object of this invention to produce valuable dyestuff intermediates. A further object is to produce substituted amino-naphthols. Additional objects will appear hereinafter.

These objects are attained by the process of the present invention wherein a nitrosonaphthol, or an azo derivative of a naphthol, is reacted with a cyanide in aqueous or alcoholic suspension or solution. The product produced has the following probable general formula:

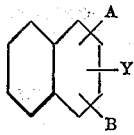

in which A represents an amino group, B represents a cyano group, and Y represents a hydroxyl group.

The invention will be more completely understood by reference to the following examples in which the quantities are stated in parts by weight:

Example 1

The crude alpha-nitroso-beta-naphthol paste obtained in the usual way from 100 parts of beta-naphthol was washed, drained and mixed with 1000 parts of water. To the suspension was added a cold solution of potassium cyanide (300 parts in 800 parts of water) and the whole was stirred and heated at 80–85° for about 1 hour. The resulting brownish-yellow solution was cooled, filtered and acidified with hydrochloric acid. A light brown crystalline precipitate was obtained. The yield was 88 parts.

The crude product was purified by recrystallization from water. The recrystallized substance had M. P. 195–200° (decomp.).

Example 2

A suspension of 50 parts 1-benzene-azo-2-naphthol in 500 parts alcohol was boiled with 100 parts potassium cyanide in 350 parts water for about 90 hours. The alcohol was removed from the resulting dark brown solution and the residue mixed with sodium hydroxide solution and extracted with ether. The remaining alkaline solution was filtered from a yellow insoluble product and acidified: 1-amino-2-hydroxy-4-cyano-naphthalene was precipitated.

The yellow insoluble product after washing with sodium hydroxide solution, and then with 10% hydrochloric acid (during contact with the acid the color of the substance became orange) and repeated crystallization from glacial acetic acid was obtained in the form of brownish-yellow needles M. P. 235° (decomp.). The substance was very sparingly soluble in hot dilute sodium hydroxide forming a yellow solution, insoluble in hot concentrated or dilute hydrochloric acid. It dissolved in concentrated sulfuric acid with a red color. The deep yellow solution in glacial acetic acid became colorless when warmed with stannous chloride and hydrochloric acid.

1-p-sulfobenzene-azo-2-naphthol sodium salt reacts similarly to yield amino-hydroxy-cyano-naphthalene.

Example 3

A suspension of 18 parts purified 4-benzene-azo-1-naphthol in a solution of 36 parts of potassium cyanide in 80 parts water and 250 parts alcohol was boiled for about 70 hours after which time a clear brown solution resulted. After removal of the alcohol the residue was extracted with aqueous sodium hydroxide and the product precipitated by acidification of the filtered solution. The dried material dissolved easily in dry ether and from the filtered solution dry hydrogen chloride afforded a gray precipitate which was apparently 4-amino-1-hydroxy-2-(or 3)cyano-naphthalene. 4-p-sulfobenzene-azo-1-naphthol sodium salt reacts similarly.

In addition to the naphthols used in the above examples various other substituted naphthols may be used, for example, the sodium salt of 1-benzene-azo-2-naphthol-6,8-disulfonic acid, the sodium salt of 1-benzene-azo-2-naphthol-3-carboxylic acid, and the sodium salt of 1-para-sulfobenzene-azo-2-naphthol-3-carboxyl-anilide. These are only a few of the substituted naphthols which may be used in carrying out the process of the present invention and it is to be understood that numerous other compounds, well known to one skilled in the art, may also be utilized herein.

The substituted groups may occupy various positions on the naphthalene nucleus and where there are acid groups the salts of these acids may be used in place of the free acids. Where an azo derivative, such as benzene-azo-naphthalene, is used the phenyl nucleus may also have groups substituted thereon, among which is the sulfonic acid group.

The reaction is preferably carried out in aqueous or alcoholic suspension or solution and is materially aided by the application of heat.

It is probable that the reaction described herein results in the production of an amino-naphthol having a cyano group substituted thereon in the 4-position, where that is unoccupied, or in the 2- or 3-position where the 4-position is occupied. However, since the exact mechanism of the reaction is not clearly understood, we do not wish to limit ourselves to a cyano-substituted-amino-naphthol but wish it to be understood that we intend to include the product, whatever it may be, produced by the interaction of a nitrosonaphthol or an azo derivative of a naphthol and a cyanide.

As many apparently widely different embodiments of this invention may be made without departing from the spirit and scope thereof, it is to be understood that we do not limit ourselves to the specific embodiments thereof except as defined in the appended claims.

We claim:

1. A process which comprises heating an alkali metal cyanide with a member selected from the group consisting of nitrosonaphthols and phenyl-azo-naphthols.

2. A process which comprises heating an aqueous solution of potassium cyanide with a member selected from the group consisting of nitrosonaphthols and phenyl-azo-naphthols.

3. A process which comprises heating an alkali metal cyanide with a compound of the following general formula:

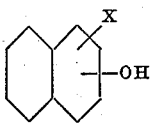

in which X represents a nitroso or a phenyl-azo group.

4. A process which comprises heating an aqueous solution of potassium cyanide with 1-benzene-azo-2-naphthol.

5. A process which comprises heating an aqueous solution of potassium cyanide with 4-benzene-azo-1-naphthol.

6. A compound having the following general formula:

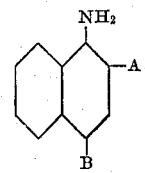

in which A represents a hydroxyl or a cyano group, and B represents a cyano group when A is a hydroxyl group and represents a hydroxyl group when A is a cyano group.

7. A compound having the following probable formula:

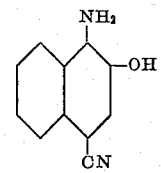

which dissolves in concentrated sulfuric acid with a red color, and is crystallized from glacial acetic acid in the form of brownish-yellow needles having a melting point of about 235° C.

8. The product produced by suspending 4-benzene-azo-1-naphthol in a water-alcohol solution of potassium cyanide, boiling the resulting suspension and separating the resulting amino-hydroxy-naphthonitriles therefrom.

9. The product produced according to the process defined in claim 1.

WILLIAM BRADLEY.
ROBERT ROBINSON.